Nov. 26, 1968    R. O. BUCKINGHAM    3,412,668
STRIP TRANSPORT SYSTEM
Filed Feb. 21, 1966    2 Sheets-Sheet 1
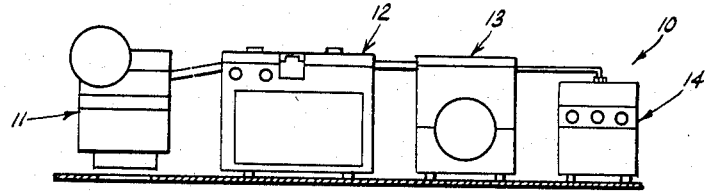
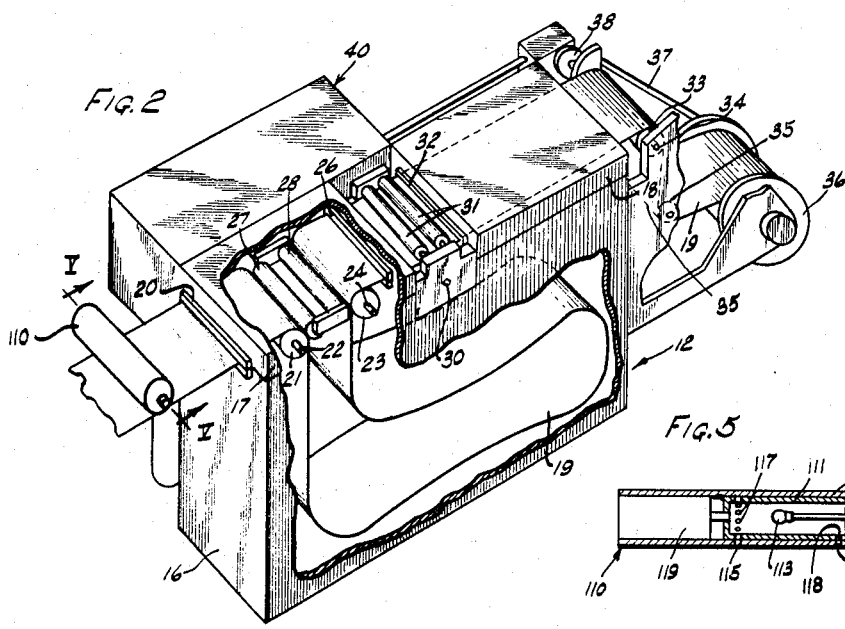
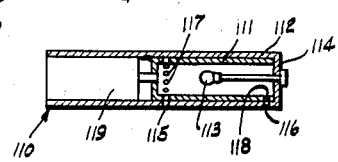
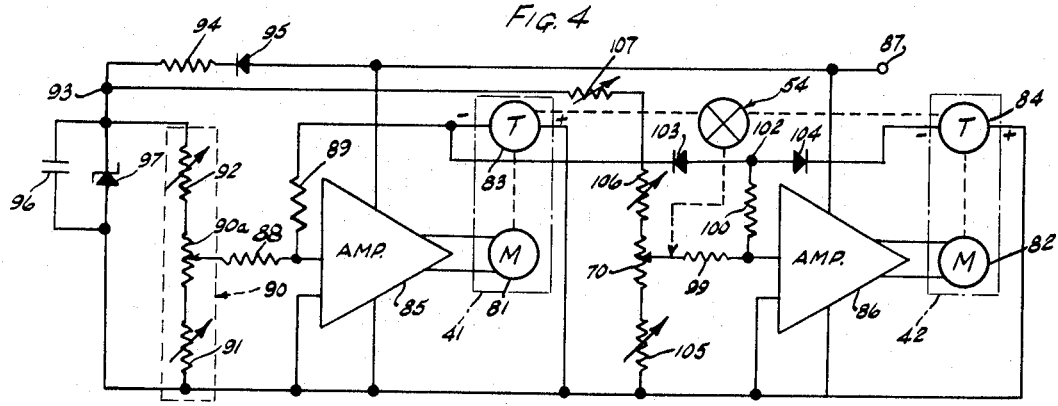
INVENTOR.
ROBERT O. BUCKINGHAM
BY
ATTORNEYS Nov. 26, 1968  R. O. BUCKINGHAM  3,412,668
STRIP TRANSPORT SYSTEM
Filed Feb. 21, 1966  2 Sheets-Sheet 2

INVENTOR.
ROBERT O. BUCKINGHAM

BY
ATTORNEYS

United States Patent Office 3,412,668
Patented Nov. 26, 1968

3,412,668
STRIP TRANSPORT SYSTEM
Robert O. Buckingham, Arlington Heights, Ill., assignor to Chicago Aerial Industries Incorporated
Filed Feb. 21, 1966, Ser. No. 528,979
24 Claims. (Cl. 95—94)

ABSTRACT OF THE DISCLOSURE

An aerial camera exposes a continuous strip of film which is immediately run through a developing bath. The film pulled from the bath is scanned by a television camera, and the resulting picture signals are transmitted to the ground. In order to insure a proper development cycle, independent drive means insert the film into and pull it out of the developer bath. A tachometer attached to the drive means generates an electrical control signal and a differential gearing between the drive means precisely regulates the length of film in the developer.

---

This invention relates to a strip feeding system for an elongated medium such as a photographic film or the like, and more particularly to a control system for feeding elongated material which operates to maintain some incremental portion of the medium in a designated zone for a controlled time under wide variations in input feed speed conditions. The system of this invention is highly accurate, reliable and trouble-free in operation while being compact, and light in weight, and it facilitates rapid processing of the film or other medium.

The system of this invention has other applications, but it was specifically designed with the object of providing a system for in-flight processing of photographic film with film being taken directly from an aerial camera and processed and with the processed film being supplied directly to a scanner operative to generate signals for transmission to a ground station where hard copy can be produced and interpreted. In such systems, it is desirable that the processing time be reduced to a minimum which is accomplished by using a strong developing solution operating at high temperature. Processing systems of the prior art have not been suitable for such operation, particularly in that they have required stable operating conditions, especially with regard to the speed of movement of the film. This problem is particularly acute because the speed of operation of the camera must be varied over a wide range because of the varying nature of aircraft flight conditions of speed and altitude and because the processing time must be maintained constant within a narrow range when a strong solution is used to reduce the time to a minimum value and also because the processing time affects the sensitometry.

According to this invention, a processing system is provided including input feed means for moving a medium into a processing region, such as a developing bath, and output feed means for withdrawing the medium from the region, with one of the feed means being operated at a variable speed and with the other of the feed means being operated at a speed so related to the speed of said one of the feed means as to maintain substantially constant the time required for all portions of the medium to pass through the processing region. Preferably, the input feed means is operated at a variable speed and output feed means is automatically controlled to maintain the processing time constant.

In the operation of th system, when the input speed is constant, the output speed is maintained constant at a value equal to the input speed, but with a length of the medium in the processing region sufficient to obtain the required processing time. If the input speed is then increased, the output speed is either maintained constant or decreased until the required length of medium is increased in the processing region, as determined by the requirements of the increased input speed. The output speed is then increased to a value equal to the input speed and remains at that value until the input speed is changed. Conversely, if the input speed should be decreased, the output speed is maintained constant or is increased until the length of the medium in the processing region is decreased to a value as determined from the lower input speed. The output speed is then reduced to a value equal to the input speed, to remain at that value until the input speed is changed.

An important feature of the invention is in the provision of length responsive means mechanically coupled to the input and output feed means and arranged to respond to the length of the medium in the processing region. Preferably, the length responsive means includes a differential gearing assembly operative to provide a high degree of accuracy.

Another important feature of the invention is in the provision of drive means including an electric motor arranged to respond to an electrical signal generated by the length responsive means. Preferably, the electrical signal is generated by a potentiometer having a movable contact mechanically coupled to the differential gearing assembly. With this arrangement, rapid response and accurate operation can be obtained, coupled with a compact light weight assembly.

A more specific feature of the invention is in the provision of a servo amplifier for controlling energization of the electric motor in response to the length signal, with the servo amplifier being also responsive to an output speed negative feedback signal, so that a constant speed of operation can be obtained when required which maintains the length in the proper proportion to speed as well as a variable speed as required when the length must be changed to re-establish the proper proportion to speed.

Another feature of the invention is in the provision of means adjacent the processing region for producing time based marks on the medium, to indicate the velocity of travel thereof.

Further features of the invention relate to the construction and arrangement of mechanical portions of the system and to electronic circuitry operative to provide highly accurate and responsive operation, while providing a system which is compact and light in weight, and rugged and reliable.

This invention contemplates other and more specific objects, features and advantages which will become more fully apparent from the following detailed description taken in conjuction with the accompanying drawings which illustrate a preferred embodiment and in which:

FIGURE 1 is a front elevational view of an aerial camera, film processing and scanning system according to the invention;

FIGURE 2 is a perspective diagrammatic view of a processor of the system of FIGURE 1;

FIGURE 4 is a schematic electrical diagram of a system for controlling the drive of the processor; and FIGURE 5 is a sectional view through a marker device of the invention, taken substantially along line V–V of FIGURE 2.

Figure 3:
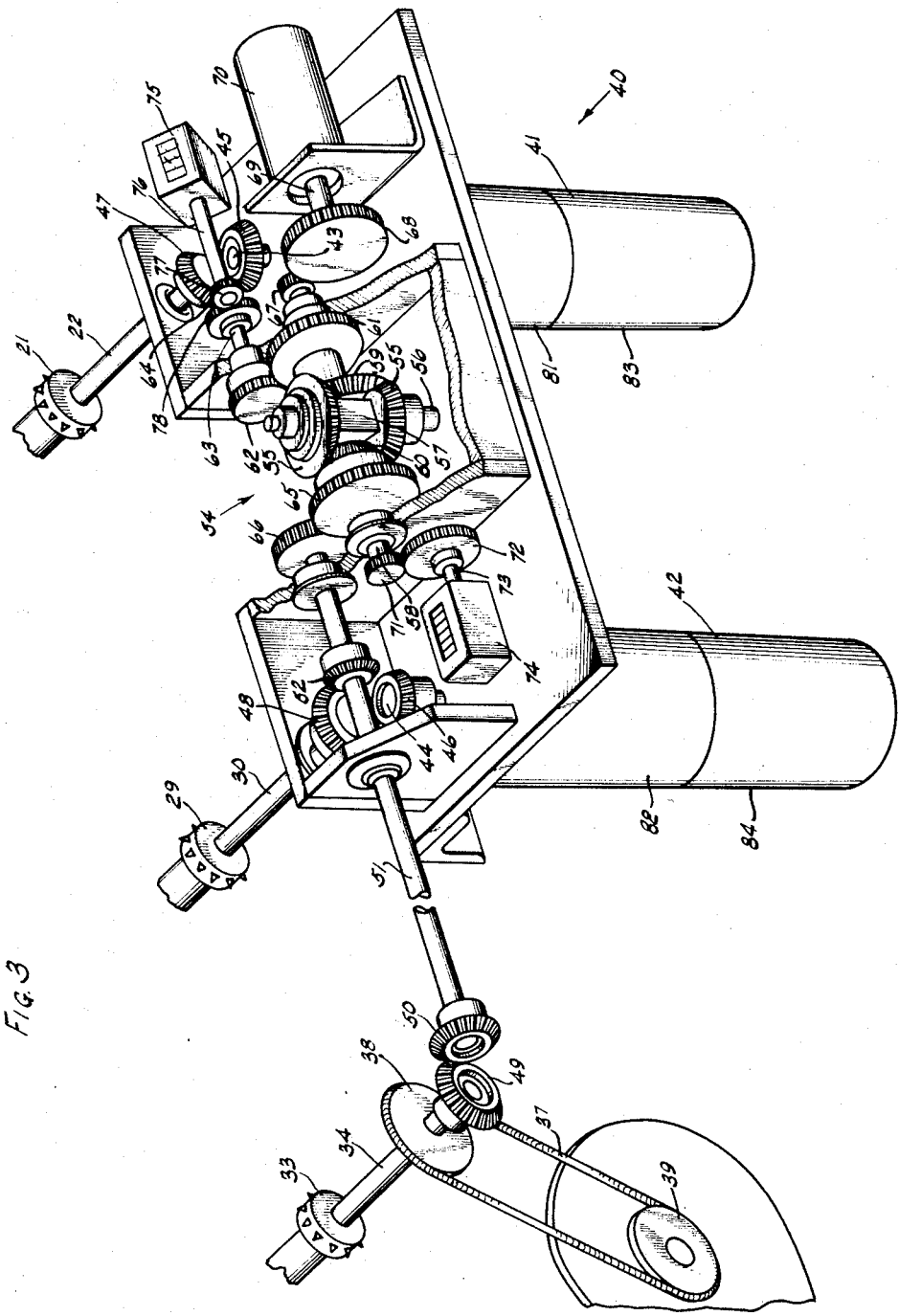
FIGURE 3 is a perspective view illustrating details of a drive and gearing assembly for the precessor shown in FIGURE 2.

Reference numeral 10 generally designates an aerial photography system adapted to be carried by an aircraft and including a camera 11 for photographing the ground from the aircraft, a processor 12 for receiving film directly from the camera 11 and for supplying processed film directly to a scanner 13 which scans the processed film for information content to produce electrical signals which are applied to a television transmitter 14 for transmission to a ground station, where the images can be viewed directly and hard copy can be produced and interpreted. Of course, the scanned film can be stored and used later for any other desired purpose.

This invention is concerned primarily with the processor 12 which can receive film directly from the camera 11 while the camera speed is varied over a wide range and which at the same time processes the film with a high degree of uniformity and in a very short length of time. By way of example, in one embodiment the film speed range may be varied from 0.1 to 15 inches per second, while the processing time is maintained constant at a very short value, on the order of 12 seconds.

Referring to FIGURE 2, the processor 12 comprises a tank 16 adapted to be filled with a monobath solution, with a cover 17 being sealingly secured over a left top portion of the tank 16, as viewed in FIGURE 2. A relatively shallow separate rinsing tank or chamber is provided in the upper right portion of the tank 16, with a cover 18 being sealingly secured over the rinse tank or chamber.

A sprocket drive is provided for moving a film 19 through the processor, it being understood that friction drives may be used. In particular, the film 19 is supplied directly from the camera 11, passes through a seal 20 and thence over a pair of input sprockets 21 on a shaft 22, thence down within the tank 16, and thence upwardly over a pair of idler sprockets 23 on a shaft 24, and out through a seal 26. A pair of idler rollers 27 and 28 are provided for holding the film against the input sprockets 21 and the idler sprockets 23.

The film then passes over a pair of output sprockets 29 on a shaft 30, not visible in FIGURE 2, but shown in FIGURE 3. The film is held against the output sprockets 29 by a pair of idler rollers 31. The film then passes through a seal 32 into the rinse tank or chamber, and out through another seal and over a pair of sprockets 33 on a shaft 34. In the arrangement as illustrated in FIGURE 2, the film thence passes over an idler roller 35 and onto a take-up spool 36, driven by means of a belt 37 and a pulley 38 on the shaft 34. In a system such as shown in FIGURE 1, the take-up spool 36 and associated parts are not mounted on the processor 12 in a manner shown in FIGURE 2, but the equivalents thereof are incorporated in the scanner 13. As shown in FIGURE 3, a pulley 39 is provided on the take-up spool 36 and is engaged by the drive belt 37. Pulley 38 overdrives the spool 36, the belt 37 being a spring which allows slip.

The drives of the input and output drive shafts 22 and 30 are so controlled as to place a certain limit on the time required for the medium to pass through the processing region. In the illustrated system, the time is maintained substantially constant, but it is within the concepts of the invention that the time might be limited either to a certain minimum value or to a certain maximum value, or both.

In accordance with this invention, the input and output drive shafts could be connected to a common motive power source through means permitting a variable displacement of the relative angular positions of the shafts. By way of example, one of the shafts could be directly coupled to a drive source and the other could be coupled thereto through a differential gearing assembly with a control shaft of the differential gearing assembly being adjusted in accordance with speed changes. To maintain a constant processing time, the control shaft of such a differential gearing assembly could be coupled to an element used also for adjustment of the speed ratio of a variable speed transmission coupled between a constant speed motor and one of the drive shafts, with the differential gearing assembly being coupled between the drive shafts. With the control shaft of the differential gearing assembly stationary, the input and output shafts would then be driven at the same speed while to accommodate speed changes, the control shaft could be moved through an angular distance corresponding to the required change in length for a new speed setting. Although an arrangement of this type would be advantageous in many applications, it has been found that it has limitations with respect to errors produced during the rapid speed changes, in some cases resulting in a reverse direction drive of one of the drive shafts, and it also has limitations with respect to torques and speed ranges attainable in practice.

In accordance with a specific feature of the invention, the input and output shafts are not coupled to a common drive source but, instead, are coupled to separate drive units in an arrangement such that the disadvantages of a common drive source are obviated. In particular, a drive unit generally designated by reference numeral 40 is provided on the rearward side of the processor 12, for driving the input sprocket drive shaft 22, the output drive shaft 30 and the take-up sprocket drive shaft 34. The construction of the drive unit 40 is illustrated in the perspective view of FIGURE 3. Referring thereto, the input sprocket drive shaft 22 and the output sprocket shaft 30 are respectively coupled mechanically to input and output motor-tachometer units 41 and 42, each of which comprises a DC motor and a tachometer in the form of a DC generator operative to develop a DC output voltage proportional to speed. The units 41 and 42 have shafts 43 and 44 geared to the armatures of the motors and tachometers through integral gear reducers. Bevel gears 45 and 46 affixed on the shafts 43 and 44 are meshed with bevel gears 47 and 48 affixed on an input sprocket drive shaft 22 and the output sprocket drive shaft 30.

To drive the take-up sprocket drive shaft 34, a bevel gear 49 affixed thereto is meshed with a bevel gear 50 on a shaft 51 which carries a bevel gear 52 meshed with the gevel gear 48.

According to an important feature of the invention, length responsive means are provided for responding to the length of the film in the tank 16.

Various forms of electrical electronic or mechanical means or combinations thereof might be employed as the length responsive means. In the illustrated system, a combination of mechanical and electrical means is used with the mechanical means being in the form of a differential gearing assembly 54 which is comparatively simple and yet very reliable and which aids in developing the desired length information with a high degree of accuracy. In particular, a pair of beveled differential pinion gears 55 are journaled on a pinion shaft 56 supported by a carrier or spider 57 which is supported on and affixed to the central part of a spider shaft 58. The differential bevel gears 55 mesh with beveled end or side gears 59 and 60 which are respectively coupled mechanically to the input and output sprocket drive shafts 22 and 30. In particular, the differential side gear 59 is rigidly connected to a gear 61 which is meshed with a gear 62 on a shaft 63 which carries a beveled gear 64 meshed with the gear 47. Both gears 59 and 61 are free to rotate on shaft 58. Similarly, the differential side gear 60 is rigidly coupled to gear 65 meshed with a gear 66 on the shaft 51 which carries the beveled gear 52 meshed with the beveled gear 48 on the output sprocket drive shaft 30. Gears 60 and 65 are free to rotate about shaft 58.

The gearing is such that the side gears 59 and 60 are rotated in opposite directions and when the input and output drive shafts 22 and 30 are rotated at the same speed and direction, the shaft 56 and the spider shaft 58 are stationary. However, when the speed of one of the shafts 22 or 30 is increased or decreased relative to the other, resulting in an increase or decrease in the length of the film between the input and output drive sprockets, the shaft 58 is rotated through an angular distance which is directly proportional to the change in length of the film loop between the input and output drive sprockets. Thus, a very simple and accurate loop length measuring arrangement is provided, to wit, the angular rotation of the spider shaft 58.

Means are provided for developing an electrical signal varying as a function of the loop length. In particular, a gear 67 on the shaft 58 is meshed with a gear 68 carried by a shaft 69 of a potentiometer 70, the shaft 69 being connected to a movable contact of the potentiometer 70, which may be a 10-turn potentiometer, for example.

The drive unit 40 also incorporates means for providing a direct visual indication of the length of the film loop within the tank 16. In particular, a gear 71 on the spider shaft 58 is meshed with a gear 72 on a shaft 73 of a counter 74, arranged to directly indicate the angular displacement of the spider shaft 58 from a predetermined position. By suitable selection of gear ratios, the counter can be caused to indicate loop length.

The unit 40 further incorporates a film footage counter 75 haivng a shaft 76 which carires a gear 77 meshed with a gear 78 affixed on the shaft 63. By suitable selection of gear ratios, the counter 75 is enabled to indicate the total amount of film length driven into the tank 16.

FIGURE 4 is a schematic diagram of a circuit for controlling the unit 40. The input and output motor-tachometer units 41 and 42 comprise DC motors 81 and 82 and tachometers 83 and 84 which, as described above in connection with FIGURE 3, and as indicated by dotted lines in FIGURE 4, are mechanically coupled together and to the differential gearing assembly 54 which, in turn, is mechanically coupled to the movable contact of potentiometer 70. The motors 81 and 82 are connected to the outputs of a pair of servo amplifiers 85 and 86 which may preferably be arranged for energizazation from an AC power supply, connected between ground and a power input terminal 87. By way of example, 115 volt, 400 cycle power may be supplied between ground and the terminal 87. One input terminal of amplifier 85 is connected to ground, while a second input terminal is connected through a resistor 88 to a speed control network 90, and also through a resistor 89 to the negative terminal of the tachometer 83 for application of a feedback voltage, the positive terminal of tachometer 83 being connected to ground.

The speed control network 90 includes a potentiometer 90a having a movable contact connected to resistor 88, with one end of potentiometer 90a being connected to ground through a minimum speed adjustment rheostat 91, while the other end thereof is connected through a speed calibration rheostat 92 to a circuit point 93 at which a constant DC reference voltage is developed relative to ground. In particular, circuit point 93 is connected through a resistor 94 and a rectifying diode 95 to the AC input terminal 87 and is connected to ground through a filter capacitor 96 in parallel with a shunt Zener diode regulator 97. By way of example, the Zener diode 97 may operate to maintain a voltage at circuit point 93 at a substantially constant positive voltage of 75 volts relative to ground.

The speed control network 90 provides a manual adjustment of speed. If desired, it may be replaced by a variable voltage source. For example, when the processor is directly coupled to the camera, that camera's image motion speed compensation command signal voltage, $$E \frac{v}{h}$$

is used to supply a speed signal to the amplifier 85, through the resistor 88.

In the operation of the circuit as thus far described, a positive voltage is applied from the speed adjustment potentiometer 90 through the resistor 88 to the input of the amplifier 85 which develops an output voltage to energize the motor 81. When the motor 81 rotates, a negative voltage proportional to its speed is applied from tachometer 83 to the amplifier input through resistor 89 to nearly balance the voltage applied from network 90, and the motor 81 is run at a speed as determined by the voltage applied from network 90. The speed is maintained substantially constant, irrespective of load and power supply voltage variations due to the negative feedback loop.

To control energization of the motor 82 of the output shaft drive unit 42, one input of amplifier 86 is connected to ground while a second input thereof is connected through a resistor 99 to the movable contact of potentiometer 70 and through a resistor 100 to a circuit point 102. Circuit point 102 is connected through a diode 103 to the negative output terminal of tachometer 83 and through a diode 104 to the negative output terminal of tachometer 84, the positive output terminal of tachometer 70 is connected through a dead time compensation rheostat 105 to ground while the other end terminal thereof is connected through a processing time adjustment rheostat 106 and a calibration rheostat 107 to the circuit point 93.

The dead time compensation rheostat 105 is quite important. At low input speeds, a short loop length is required. Since there is a physical limit in the attainable shortness of the loop, imposed by minimum sprocket sizes and spacing, care must be exercised to prevent the output sprocket drive from attempting to reduce the loop length below that which is physically attainable. Also, the minimum output rate must be established at the desired level when the loop length is at a minimum. Breakage of the film at minimum loop length is prevented by providing a switching action with potentiometer 70 and desired output rate at the minimum film length is established by the setting of rheostat 105. Advantageously, the switching achieved by potentiometer 70 is effected by permitting its movable contact to move off its winding at its high resistance (lower) end. When the circuit is thus opened through potentiometer 70, the voltage applied through resistor 99 to amplifier 86 is reduced to zero. This stops motor 82 and, if the switching action is properly related to minimum loop size, reduces loop size to a minimum without imposing excessive physical strain on the film.

The processing time adjustment rheostat 106 is adjusted in accordance with the sensitometric attributes of the film being processed, in order to obtain the optimum processing time. The processing time adjustment rheostat 106 is preferably calibrated, and the calibration rheostat 107 is provided for adjustment to insure that the calibration of rheostat 106 is correct.

In the normal operation, both diodes 103 and 104 are conductive and the circuit point 102 is effectively connected through the diodes 103 and 104 to the negative output terminals of the tachometers 83 and 84. The circuit then operates to produce a linear relationship between the loop length and speed signals applied through resistors 99 and 100, respectively, to maintain a constant processing time on the film passing through the monobath in the tank 16.

Diodes 103 and 104 together with resistor 100 form an OR gate which couples the tachometer with the higher voltage into the output drive servo loop, in order to obtain a more rapid response to sudden increases in input drive speed, as compared to the response which would be obtained with the circuit point 102 connected only to the output of tachometer 84. The diode 103 is operative alone during rapid increases in the input drive speed when the output voltage of tachometer 83 becomes greater than that of the tachometer 84. A higher negative voltage is then applied through diode 103 and resistor 100 to the amplifier 86, to reduce the output thereof and reduce the speed of the output shaft drive motor 82, so that the loop length is rapidly increased until the proper value is obtained, after which the negative voltage applied through resistor 100 is overcome by a positive voltage applied through resistor 99, to increase the output of amplifier 86 and to accelerate the motor 82 to the proper speed. The output voltage of the tachometer 84 is then such that the diode 104 is conductive along with diode 103, and a negative feed-back loop is provided which is effective to maintain the speed at the required value irrespective of load and supply voltage variations.

Considering the operation of the differential gearing assembly 54 and the circuit of FIGURE 4 in greater detail, it is noted that a mechanical differential may be characterized by the following equation:

$$D_s = \frac{D_a + D_b}{2}$$

where:

$D_s$ = the displacement of the spider shaft
$D_a$ = the displacement of an end or side gear 59, and
$D_b$ = the displacement of an end or side gear 60.

In applying the above general equation to the illustrated system, it is noted that the direction of rotation of one of the end or side gears 59 or 60 is reversed relative to the other, so that the sign of one of the side gear terms in the equation may be changed to result in the equation:

$$D_{58} = \frac{D_{60} - D_{59}}{2}$$

Accordingly, the displacement of the spider shaft 58 is a function of the difference in displacement of the input and output shafts, and is a true analog of the loop length in the monobath tank 16. Since the spider shaft 58 is mechanically coupled to the potentiometer 70, the voltage of the movable contact thereof, with a constant voltage applied to the end terminals thereof, is also a true analog of the film loop length.

Whenever there is a film loop in the monobath tank 16, there will be a displacement of the input and output shafts 22 and 30 and a corresponding displacement of the differential spider shaft 58. The displacement of the spider shaft 58 turns the shaft 69 of the potentiometer 70 through the gears 67, 68, causing a positive voltage input to the amplifier 86 through the resistor 99. The positive voltage is amplified and causes the motor 82 to turn, which produces two negative feedbacks. A negative electrical feedback from the tachometer 84 balances out the positive potentiometer voltage. The mechanical feedback through gears 48, 52, 66 and 65 also moves the end or side gear 60 of the differential gearing assembly 54 in a direction to move the movable contact of potentiometer 70 toward zero voltages.

The negative electrical feedback from the tachometer establishes a linear relationship between the length of the film loop in the tank and the speed of the output sprocket shaft 30 because the positive voltage input to the servo amplifier 86 is the voltage on the movable contact of the potentiometer 70, (analog of loop length) and the negative tachometer voltage is proportional to the shaft speed (analog of speed). This can be demonstrated by considering the current input to the amplifier 86. The positive input current $i_L$ from the potentiometer 70 must equal the negative current $i_V$ from the tachometer 84. Thus:

$$i_L - i_V = 0$$

It is proper to assume that the current input of the amplifier 86 is zero because the amplifier has a very high gain. The relationship between the voltages can be written:

$$i_L = \frac{E_L}{R_{99}} = i_V = \frac{E_V}{R_{100}}$$

where:

$E_L$ = the loop length potentiometer voltage
$R_{99}$ = the resistance of input resistor 99
$E_V$ = the voltage of tachometer 84
$R_{100}$ = the resistance of feedback resistor 100

Solving for $E_L$, $$E_L = \frac{R_{99}}{R_{100}} E_V$$

Since $R_{99}/R_{100}$ is a constant, the servo system maintains a linear relationship between $E_L$ and $E_V$, and thereby a linear relationship between loop length and film velocity.

The time required for the film to pass through the processing tank is equal to the loop length divided by the film velocity and with a linear relationship being maintained therebetween, the processing time is constant.

The mechanical negative feedback from the output sprocket shaft 30 to the differential end or side gear 60 tends to reduce the displacement of the input and output shafts 22 and 30, and hence tends to reduce the loop length in the processing tank 16. When the input drive sprockets 21 on shaft 22 are feeding film into the tank and the output drive sprockets 29 on shaft 30 are removing film from the tank at the same rate, then the spider shaft 58 remains stationary, and an equilibrium condition exists; the input and output film velocities are equal and the film loop length remains fixed.

When the input velocity is changed to a new value by adjusting the position of the movable contact of potentiometer 90, then the equilibrium conditions are disturbed. The output drive control, because of its dual velocity (tachometer voltage) and displacement (differential gear) feedback, immediately seeks out the new correct equilibrium conditions with the same ratio between loop length and velocity, to maintain the processing time constant.

By way of illustrative example, and not by way of limitation, the motors 81 and 82 may have maximum speed ratings on the order of 10,300 r.p.m., and the units 41 and 42 may incorporate 20:1 reduction gearheads with 1.5:1 gear reductions between gears 45 and 46 and gears 47 and 48, respectively, so that the maximum speeds of shafts 22 and 30 may be on the order of 343 r.p.m. The tachometers 83 and 84 may have constants of 6.3 volts/1000 r.p.m. to produce maixmum voltages on the order of 65 volts. The potentiometer 70 may be a 10K, 10 turn potentiometer, with resistors 99 and 100 having values of 100K and with rheostats 105, 106, and 107 having values of 500 ohms, 10K and 2K, respectively. In the input servo circuit resistors 88 and 89 may have values of 200K each, potentiometer 90a a value of 10K, and rheostats 91 and 92 values of 200 ohms and 2K, respectively. The Zener diode 97 may be such as to maintain the voltage at circuit point 93 constant at 75 volts positive with respect to ground.

The gears may have numbers of teeth according to the following table:

| Reference numeral | Number of teeth |
|---|---|
| 45 | 30 |
| 46 | 30 |
| 47 | 45 |
| 48 | 45 |
| 49 | 45 |
| 50 | 30 |
| 52 | 30 |
| 55 | 40 |
| 59 | 40 |
| 60 | 40 |
| 61 | 60 |
| 62 | 40 |
| 64 | 30 |
| 65 | 60 |
| 66 | 40 |
| 67 | 12 |
| 68 | 60 |
| 71 | 22 |
| 72 | 42 |

With the gears having relative numbers of teeth according to the above table, and with other components having characteristics and values according to the above examples, the input film speed may be varied from 0.1 to 15 inches per second, while the processing time may be maintained constant at any desired value between 8 and 16 seconds as selected by the time adjustment rheostat 106.

It will be appreciated that the principles of the invention may be applied to systems of types other than the illustrated film processing system. By way of example, and not by way of limitation, the elongated medium being processed may be a strip or tape which is processed by application of a coating of magnetic or photo-sensitive material thereto, a tape, sheet, or web which is coated or otherwise processed by means of vacuum or chemical deposition techniqes, as by using organic decomposition or metalorganic compounds such as nickel carbonyls, for example, or a strip or tape of metallic material which is processed by passing it through a plating bath. It will be appreciated also that a plurality of processing time control systems can be combined, as, for example, in controlling the respective times of a series of processes performed sequentially on an elongated medium, with limits being placed on the respective times, either by maintaining the time constant, or by setting certain minimum or maximum values.

Referring to FIGURES 2 and 5, reference numeral 110 generally designates a timing light device which operates on the film 19 before it enters the processor 12 to expose edge portions of the film to light in a manner such as to put time based markers on the edge of the film. Such markers provide a permanent record on the film edges of the velocity at which each piece of film was transported through the processor 12.

The unit 110 comprises inner and outer concentric cylinders 111 and 112 with an incandescent lamp 113 supported from an end wall of 114 in the center of the inner cylinder 111. The outer cylinder 112 has two holes 115 and 116 therein spaced so that each hole is over one edge of the film 19 as it passes into the processor 12. The inner cylinder 111 has ten equally spaced holes 117, around its periphery in a place corresponding to the hole 115 in the outer cylinder 112, and has a single hole 118 in a plane corresponding to the hole 116 in the outer cylinder 112. The inner cylinder 111 is driven by a 60 r.p.m. synchronous motor 119 so that the inner cylinder rotates at one revolution per second. This rate of revolution produces 10 flashes of light per second passing through the hole 115 and the outer cylinder 112 and produces one flash per second through the hole 116. By measuring the distances between marks on the film, it is easily ascertained at which velocity each section of the film was transported.

It will be appreciated that markers may be produced in other ways as by notching the medium or by imprinting marks thereon.

It will be understood that modifications and variations may be effected without departing from the spirit and scope of the novel concepts of this invention.

I claim as my invention:

1. In a processing system for an elongated medium, means defining a processing region, medium supply means, input feed means for moving the medium from said supply means into said processing region, output feed means for withdrawing the medium from said processing region, first drive means for operating one of said feed means at a variable speed, means independent of tension in said medium for developing an electrical signal which varies as a function of the speed of said first drive means, and second drive means responsive to said electrical signal for operating the other of said feed means at a speed so related to the speed of said one of said feed means as to place a predetermined control on the time required for all portions of the medium to pass through said processing region.

2. In a processing system as defined in claim 1, said time being limited to a certain minimum value.

3. In a processing system as defined in claim 1, said time being limited to a certain maximum value.

4. In a processing system as defined in claim 1, said time being maintained substantially constant.

5. In a processing system for an elongated medium, means defining a processing region, medium supply means, input feed means for moving the medium from said supply means into said processing region, output feed means for withdrawing the medium from said processing region, first drive means for operating one of said feed means at a variable speed, second drive means for operating the other of said feed means at a speed so related to the speed of said one of said feed means as to place a predetermined control on the time required for all portions of the medium to pass through said processing region, said second drive means including a differential gearing assembly having a pair of elements mechanically coupled to said input and output feed means and a third element having an angular position corresponding to the length of the medium in said processing region.

6. In a processing system as defined in claim 5, said second drive means further including means responsive to the angular position of said third element of said differential gearing assembly for controlling the drive of said other of said feed means.

7. In a processing system as defined in claim 5, said second drive means further including means responsive to the speed of drive of said one of said feed means for controlling the angular position of said third element of said differential gearing assembly.

8. In a processing system as defined in claim 1, said input feed means being operated by said first drive means and said output feed means being operated by said second drive means.

9. In a processing system for an elongated medium, means defining a processing region, medium supply means, input feed means for moving the medium from said supply means into said processing region, output feed means for withdrawing the medium from said processing region, first drive means for operating one of said feed means at a variable speed, second drive means for operating the other of said feed means at a speed so related to the speed of said one of said feed means as to place a predetermined control on the time required for all portions of the medium to pass through said processing region, said second drive means including length responsive means mechanically coupled to said input and output feed means and arranged to respond to the length of the medium in said processing region.

10. In a processing system as defined in claim 9, said length responsive means including a differential gearing assembly and potentiometer means having a movable contact mechanically coupled to said differential gearing assembly.

11. In a processing system as defined in claim 1, film developing bath means in said processing region.

12. In a processing system as defined in claim 1, said medium being a photographic film and said supply means being a camera for supplying exposed film to be directly moved by said input feed means into said processing region.

13. In a processing system for an elongated medium, means defining a processing region, medium supply means, input feed means for moving the medium from said supply means into said processing region, output feed means for withdrawing the medium from said processing region, first drive means for operating one of said feed means at a variable speed, second drive means for operating the other of said feed means at a speed so related to the speed of said one of said feed means as to place a predetermined control on the time required for all portions of the medium to pass through said processing region, said second drive means including electric motor means for driving said feed means, length responsive means mechanically coupled to said input and output feed means and arranged to develop an electrical signal varying as a function of the length of the medium in said processing region, and means responsive to said electrical signal for controlling energization of said electric motor means.

14. In a processing system for an elongated medium, means defining a processing region, medium supply means, input feed means for moving the medium from said supply means into said processing region, output feed means for withdrawing the medium from said processing region, first drive means for operating one of said feed means at a variable speed, second drive means, for operating the other of said feed means at a speed so related to the speed of said one of said feed means as to place a predetermined control on the time required for all portions of the medium to pass through said processing region, said second drive means including electric motor means for driving said other of said feed means, servo amplifier means having an input and an output, means coupling said output to said electric motor means, length responsive means mechanically coupled to said input and output feed means and arranged to develop an electrical signal varying as a function of the length of the medium in said processing region, and means applying said electrical signals to said servo amplifier means input.

15. In a processing system as defined in claim 14, tachometer means for developing an electrical signal varying as a function of the speed of operation of said other of said feed means, and means for applying said speed signal to said servo amplifier means input.

16. In a processing system for an elongated medium, means defining a processing region, medium supply means, input feed means for moving the medium from said supply means into said processing region, output feed means for withdrawing the medium from said processing region, first drive means for operating one of said feed means at a variable speed, second drive means for operating the other of said feed means at a speed so related to the speed of said one of said feed means as to place a predetermined control on the time required for all portions of the medium to pass through said processing region, said first drive means including electrical motor means for driving said one of said feed means, servo amplifier means having an input and an output, means coupling said output to said electric motor means, tachometer means for developing an electrical speed signal varying as a function of the speed of said electric motor means, and means for applying said electrical speed signal to said input.

17. In a processing system for an elongated medium, means defining a processing region, medium supply means, input fed means for moving the medium from said supply means into said processing region, output feed means for withdrawing the medium from said processing region, first drive means for operating one of said feed means at a variable speed, second drive means for operating the other of said feed means at a speed so related to the speed of said one of said feed means as to place a predetermined control on the time required for all portions of the medium to pass through said processing region, said second drive means including electric motor means for driving said other of said feed means, servo amplifier means having an input and an output, means coupling said output to said electric motor means, length responsive means mechanically coupled to said input and output feed means and arranged to develop an electrical signal varying as a function of the length of the medium in said processing region, means for applying said electrical signal to said input, first and second tachometer means for developing first and second speed signals varying as functions of the speeds of said one and said other of said feed means, and OR gate means for applying said speed signals to said input to reduce the speed of said other of said feed means either when the speed of said other of said feed means exceeds a certain value or when the speed of said one of said feed means exceeds a certain value.

18. In a processing system as defined in claim 17, said input feed means being operated by said first drive means and said output feed means being operated by said second drive means.

19. In a processing system as defined in claim 1, said second drive means including a potentiometer having a movable contact and means mechanically coupled to said input and output feed means for moving said contact in proportion to the length of the medium in said processing region.

20. In a processing system for an elongated medium, means defining a processing region, medium supply means, input feed means for moving the medium from said supply means into said processing region, output feed means for withdrawing the medium from said processing region, first drive means for operating one of said feed means at a variable speed, second drive means for operating the other of said feed means at a speed so related to the speed of said one of said feed means as to place a predetermined control on the time required for all portions of the medium to pass through said processing region, said second drive means including a potentiometer having a movable contact, means mechanically coupled to said input and output feed means for moving said contact in proportion to the length of the medium in said processing region, said second drive means further including electric motor means for driving said other of said fed means, servo amplifier means having an input and an output, means coupling said output to said electric motor means, means for supplying a substantially constant voltage to said potentiometer means, and means electrically coupling said movable contact to said input.

21. In a processing system as defined in claim 20, tachometer means for developing an electrical speed signal varying as a function of the speed of operation of said other of said fed means, and a pair of resistors for coupling said movable contact and said speed signal to said input.

22. In a processing system for an elongated medium, means defining a processing region, medium supply means, input feed means for moving the medium from said supply means into said processing region, output feed means for withdrawing the medium from said processing region, first drive means for operating one of said feed means at a variable speed, second drive means for operating the other of said feed means at a speed so related to the speed of said one of said feed means as to place a predetermined control on the time required for all portions of the medium to pass through said processing region, said second drive means including electric motor means for driving said feed means, amplifier means having an input and an output, means coupling said output to said electric motor means, potentiometer means having a movable contact, means for mechanically moving said contact in proportion to the length of the medium in said processing region, means electrically coupling said contact to said input, and means for selectively electrically connecting said potentiometer means to a voltage source when a minimum length of said medium in said processing region is exceeded and for disconnecting said potentiometer from said voltage source when the minimum length of said medium in said processing region is reached, said voltage source including rheostat means adjustable to set a minimum output rate of the medium from said processing region.

23. In a processing system as defined in claim 1, marker means adjacent said processing region for producing time based markers on said medium.

24. In a processing system as defined in claim 23, said medium being a photographic film, and said marker means comprising means for exposing an edge portion of the film to flashes of light produced at regular time intervals.

References Cited

UNITED STATES PATENTS

| | | | |
|---|---|---|---|
| 2,945,429 | 7/1960 | Grant | 95—94 |
| 3,266,393 | 8/1966 | Chitayat | 95—1.1 |

NORTON ANSHER, *Primary Examiner.*

C. E. SMITH, *Assistant Examiner.*

UNITED STATES PATENT OFFICE
CERTIFICATE OF CORRECTION

Patent No. 3,412,668

November 26, 196

Robert O. Buckingham

It is certified that error appears in the above identified patent and that said Letters Patent are hereby corrected as shown below:

Column 6, line 18, before "70" insert -- 84 being grounded. One end terminal of the potentiometer --.

Signed and sealed this 10th day of March 1970.

(SEAL)
Attest:

Edward M. Fletcher, Jr.
Attesting Officer

WILLIAM E. SCHUYLER, JR.
Commissioner of Patents